(12) United States Patent
Lin

(10) Patent No.: US 8,113,373 B2
(45) Date of Patent: Feb. 14, 2012

(54) VESSEL STRUCTURE WITH THREADED COUPLING OF UPPER COVER TO CONTAINING BODY

(75) Inventor: Chang-Yu Lin, Kaohsiung (TW)

(73) Assignee: Woodmax Ky Industries Corp., Kaohsiung (TW)

( * ) Notice: Subject to any disclaimer, the term of this patent is extended or adjusted under 35 U.S.C. 154(b) by 558 days.

(21) Appl. No.: 12/285,194

(22) Filed: Sep. 30, 2008

(65) Prior Publication Data
US 2010/0078432 A1    Apr. 1, 2010

(51) Int. Cl.
  *B65D 21/02*    (2006.01)
  *B65D 41/04*    (2006.01)
  *B65D 6/00*     (2006.01)
  *B65D 25/10*    (2006.01)
  *A47G 19/22*    (2006.01)
  *B65D 51/18*    (2006.01)

(52) U.S. Cl. ............ 220/23.91; 220/288; 220/625; 220/703; 220/254.3; 220/553; 220/756

(58) Field of Classification Search ........... 220/254.3, 220/625, 703, 23.91, 916, 23.87, 527, 553, 220/557, 23.89, 550, 555, 556, 525, 755, 220/756, 288; 206/217; 426/120; D9/761, D9/756, 737; 215/386, 387
See application file for complete search history.

(56) References Cited

U.S. PATENT DOCUMENTS

| 5,148,936 A * | 9/1992 | DeGrow ............... 220/254.3 |
| 5,884,551 A * | 3/1999 | Orrico et al. ........... 99/317 |
| 7,631,781 B2 * | 12/2009 | Chen ..................... 220/703 |
| 2003/0080128 A1 * | 5/2003 | Brodner et al. ......... 220/23.87 |

* cited by examiner

Primary Examiner — Robin Hylton
(74) Attorney, Agent, or Firm — Rosenberg, Klein & Lee

(57) ABSTRACT

A vessel includes a containing body, an upper cover, a thing holding member, and a bottom cover; the containing body has an upper opening; the upper cover is threadedly joined on the containing body to cover the opening; the upper cover has a drink outlet, and a moving cap is pivoted on the upper cover to seal the drink outlet; the upper cover further has several bores so that drinks can flow out of the containing body through the drink outlet easily; the thing holding member is securely joined on the containing body, and has several hollow holding portions on an inner circumferential side to contain drink materials such as tea bags and sugar bags; the bottom cover is joined on a lower end of the thing holding member to close the hollow holding portions.

8 Claims, 7 Drawing Sheets

VESSEL STRUCTURE WITH THREADED COUPLING OF UPPER COVER TO CONTAINING BODY

BACKGROUND OF THE INVENTION

1. Field of the Invention

The present invention relates to a vessel, more particularly one, which includes a thing holding member to contain drink materials; thus, tea bags and sugar bags can be carried in the container for future use.

2. Brief Description of the Prior Art

Many people, especially busy workers, students, and commuters, like to carry a drink vessel, and make drinks from tea bags, cereal bags, sugar bags etc for themselves.

However, the drink material and the vessel have to be carried separately, and in turn it is possible to forget to carry the drink material.

SUMMARY OF THE INVENTION

It is a main object of the present invention to provide an improvement on a vessel to overcome the above problems.

A vessel in accordance with an embodiment of the present invention includes a containing body, an upper cover, a thing holding member, and a bottom cover. The upper cover is threadedly joined on an upper end of the containing body to cover an upper opening of the body. the upper cover has a drink outlet, and a moving cap is pivoted on the upper cover to seal the drink outlet. The upper cover further has several bores thereon so that drinks can flow out of the containing body through the drink outlet easily. The thing holding member is securely joined on the containing body, and has several hollow holding portions on an inner circumferential side to contain drink materials such as tea bags and sugar bags. The bottom cover is joined on a lower end of the thing holding member to close the hollow holding portions, and it has a force application portion on a bottom side for the user to exert force thereon. Therefore, tea bags and sugar bags can be carried in the vessel for future use. The containing body has a lower step-shaped portion having a smaller diameter than the upper end.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
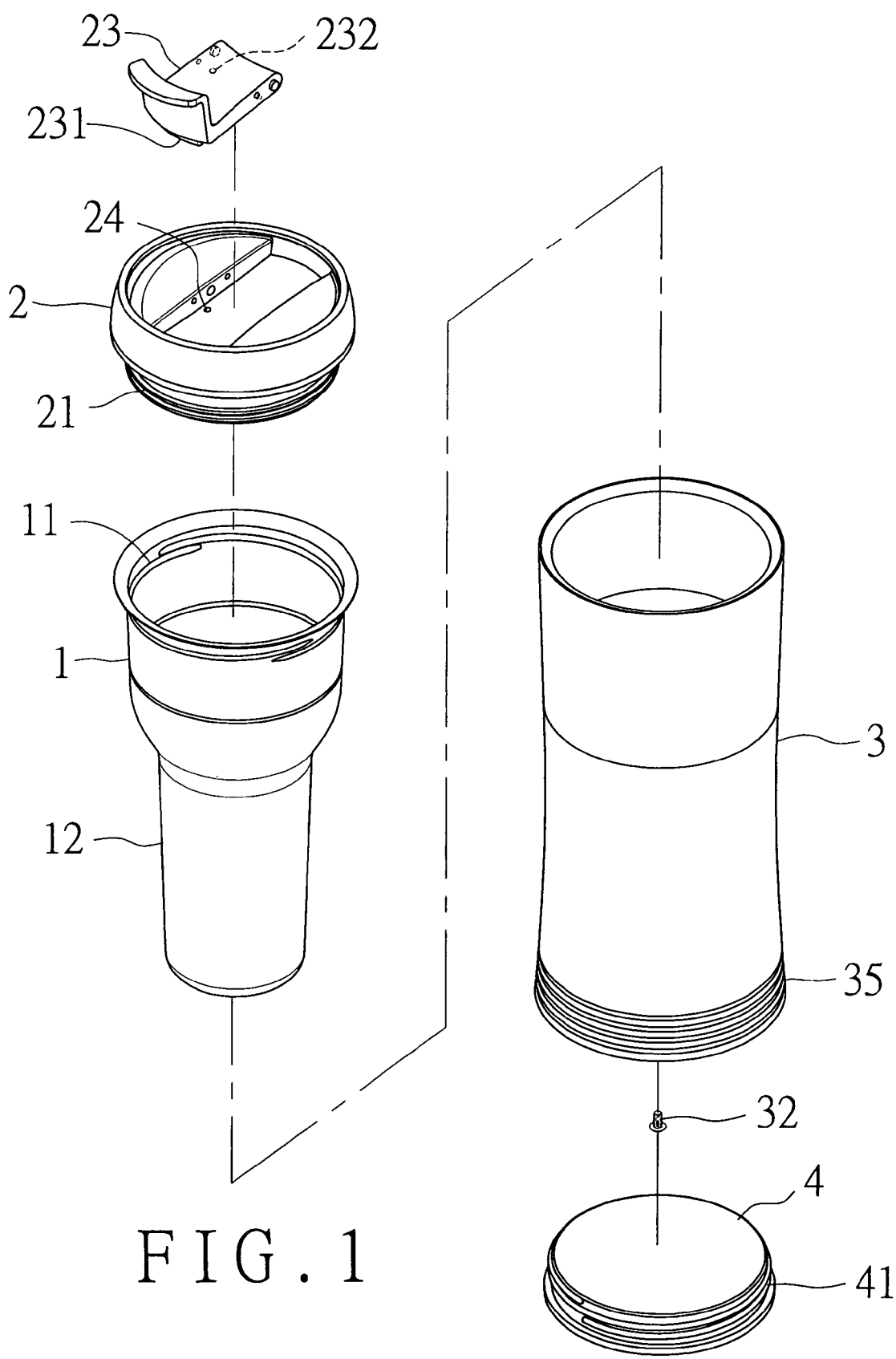
FIG. 1 is an exploded perspective view of a first preferred embodiment of the present invention.
Figure 2:
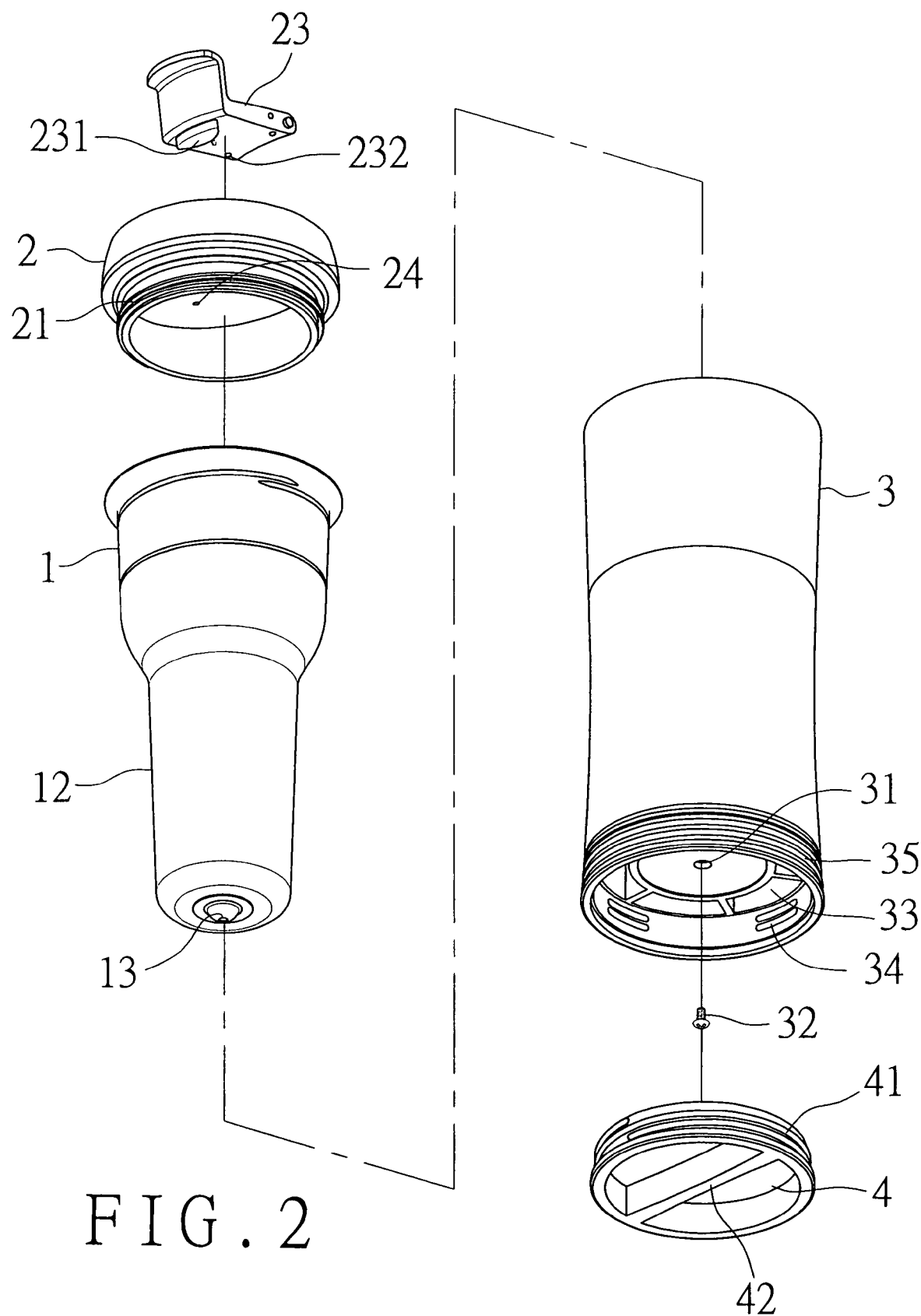
FIG. 2 is another exploded perspective view of the first preferred embodiment.
Figure 3:
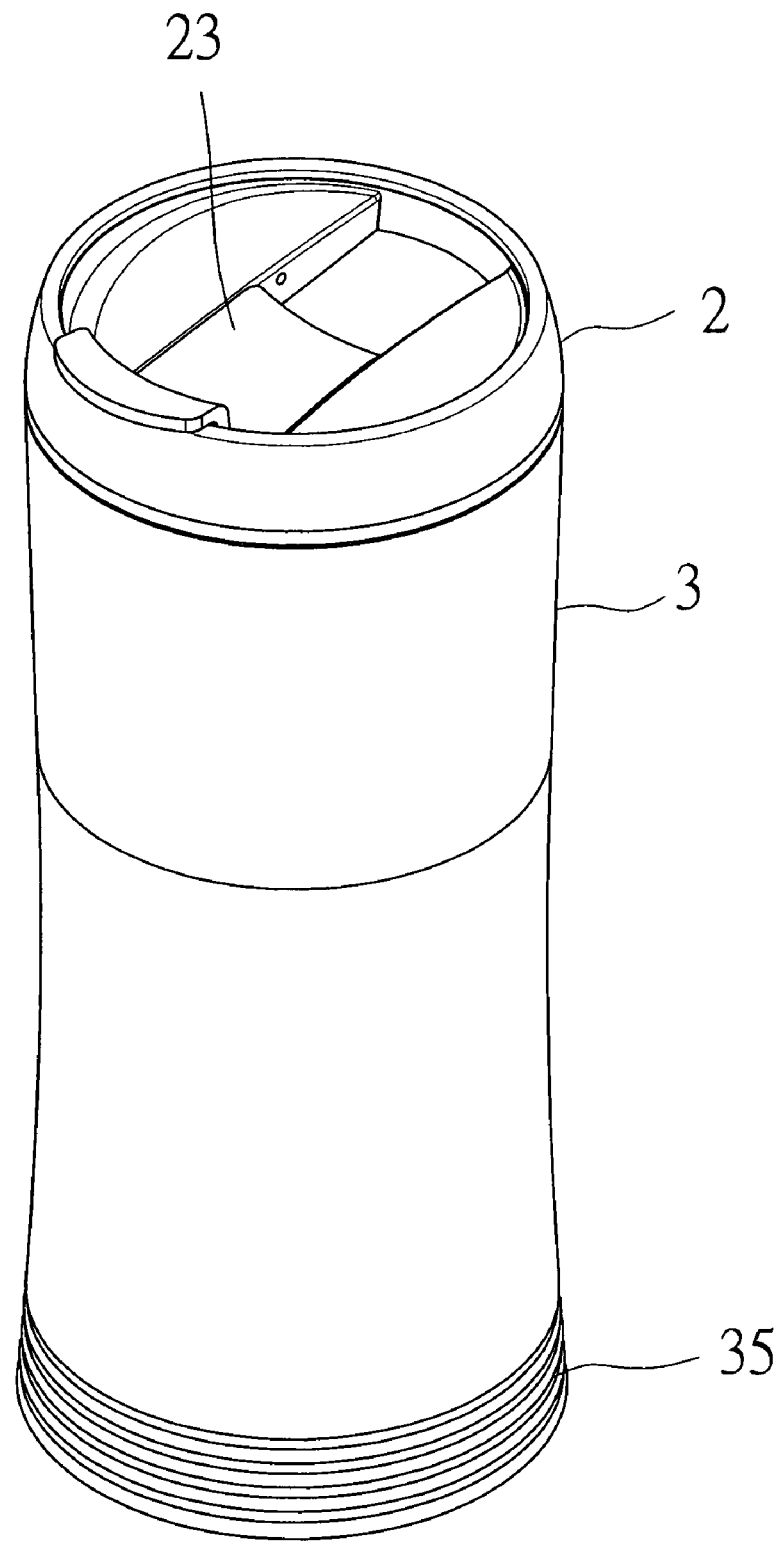
FIG. 3 is a perspective view of the first preferred embodiment.

Referring to FIGS. 1 and 2, a first preferred embodiment of a vessel of the present invention consists of a containing body 1, an upper cover 2, a thing holding member 3, and a bottom cover 4.

The containing body 1 has threads 11 on an inner side of an upper portion thereof, which encloses an upper opening of the containing body 1. The containing body 1 has a lower step-shaped portion 12, which has a smaller diameter than the upper end. The lower step-shaped portion 12 has a screw hole 13 on a bottom side.

Figure 4:
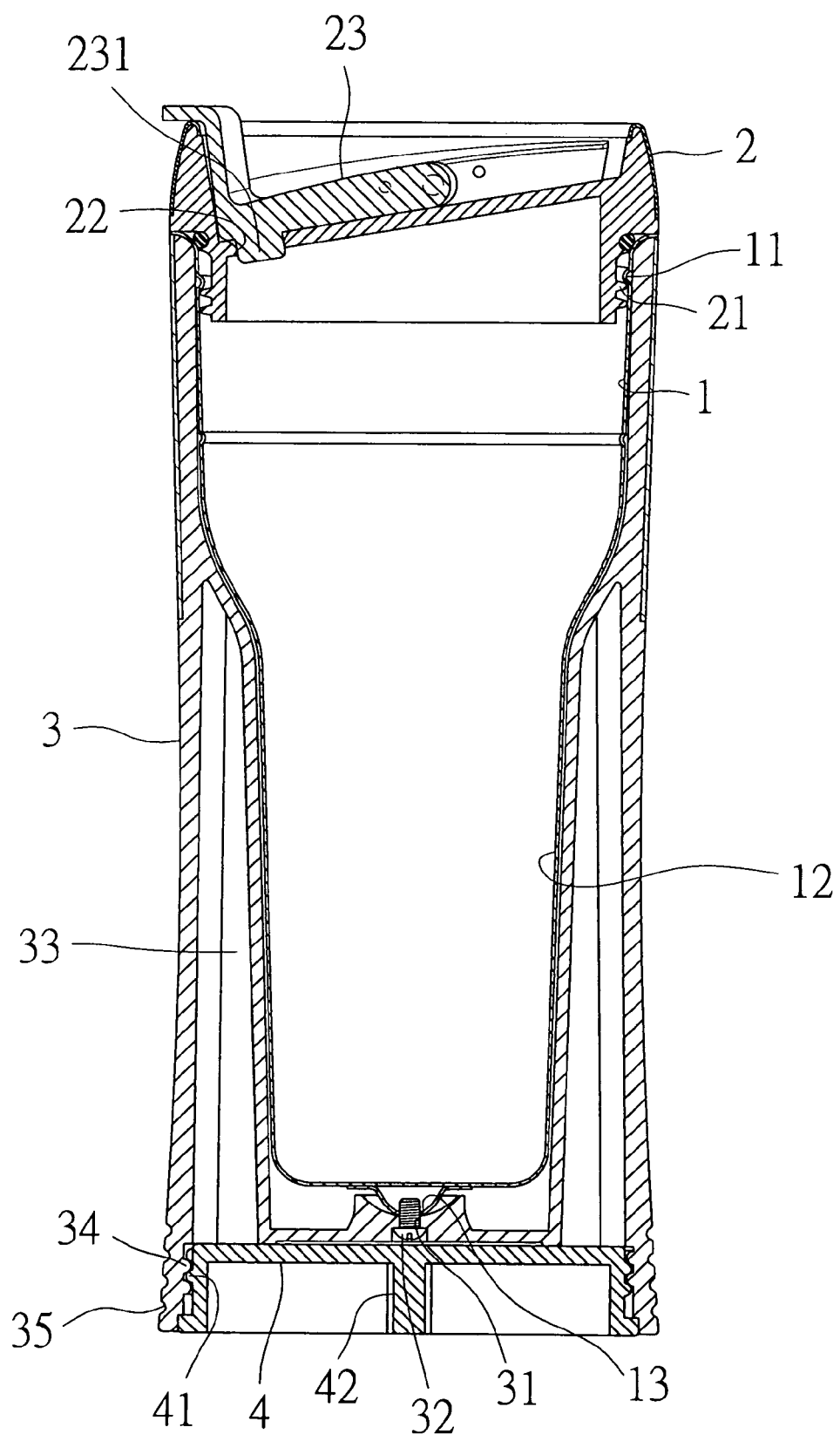
FIG. 4 is a sectional view of the first preferred embodiment, taken when the moving cap is closed.
Figure 5:
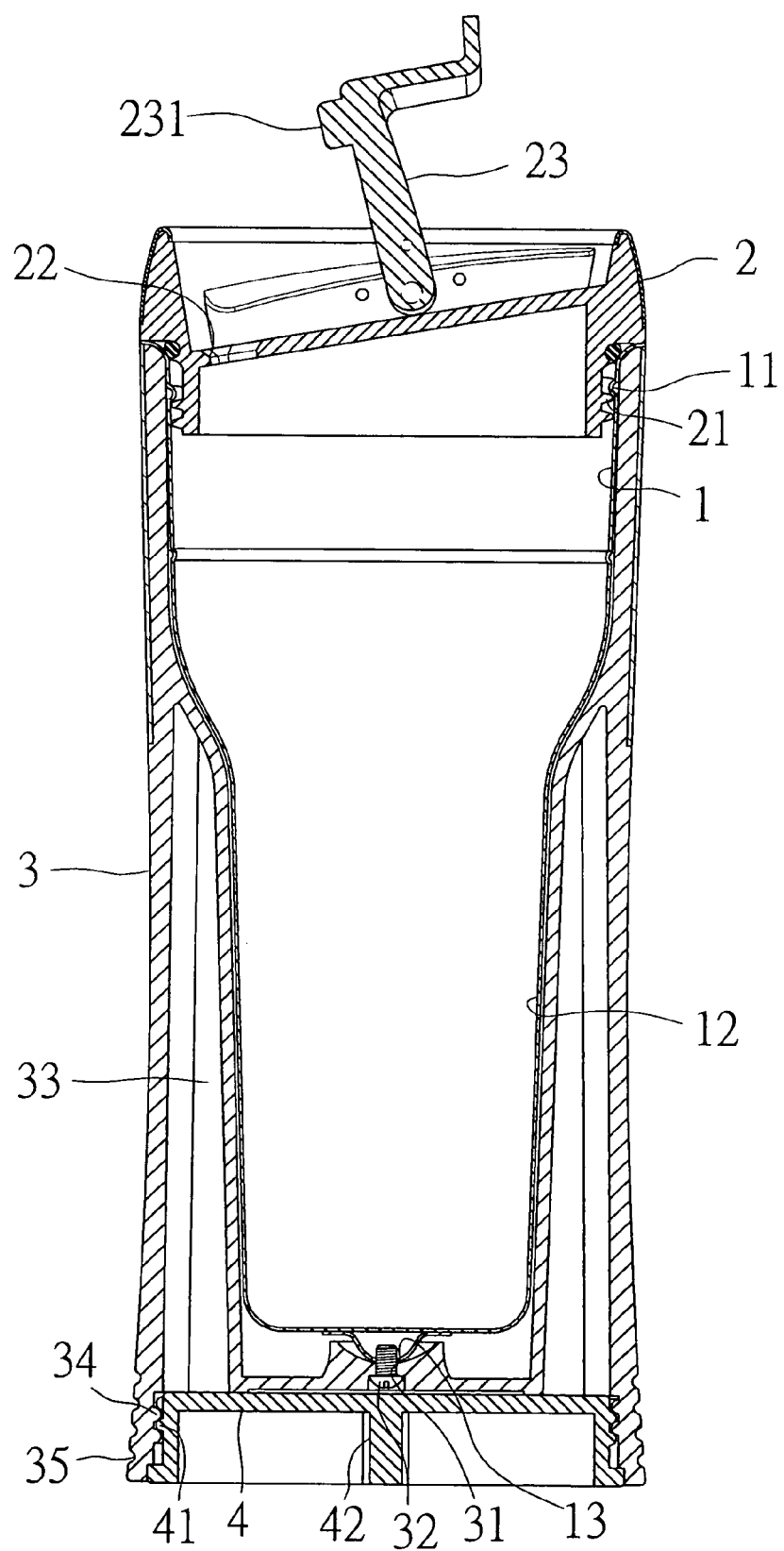
FIG. 5 is a sectional view of the first preferred embodiment, taken when the moving cap is opened.
Figure 6:
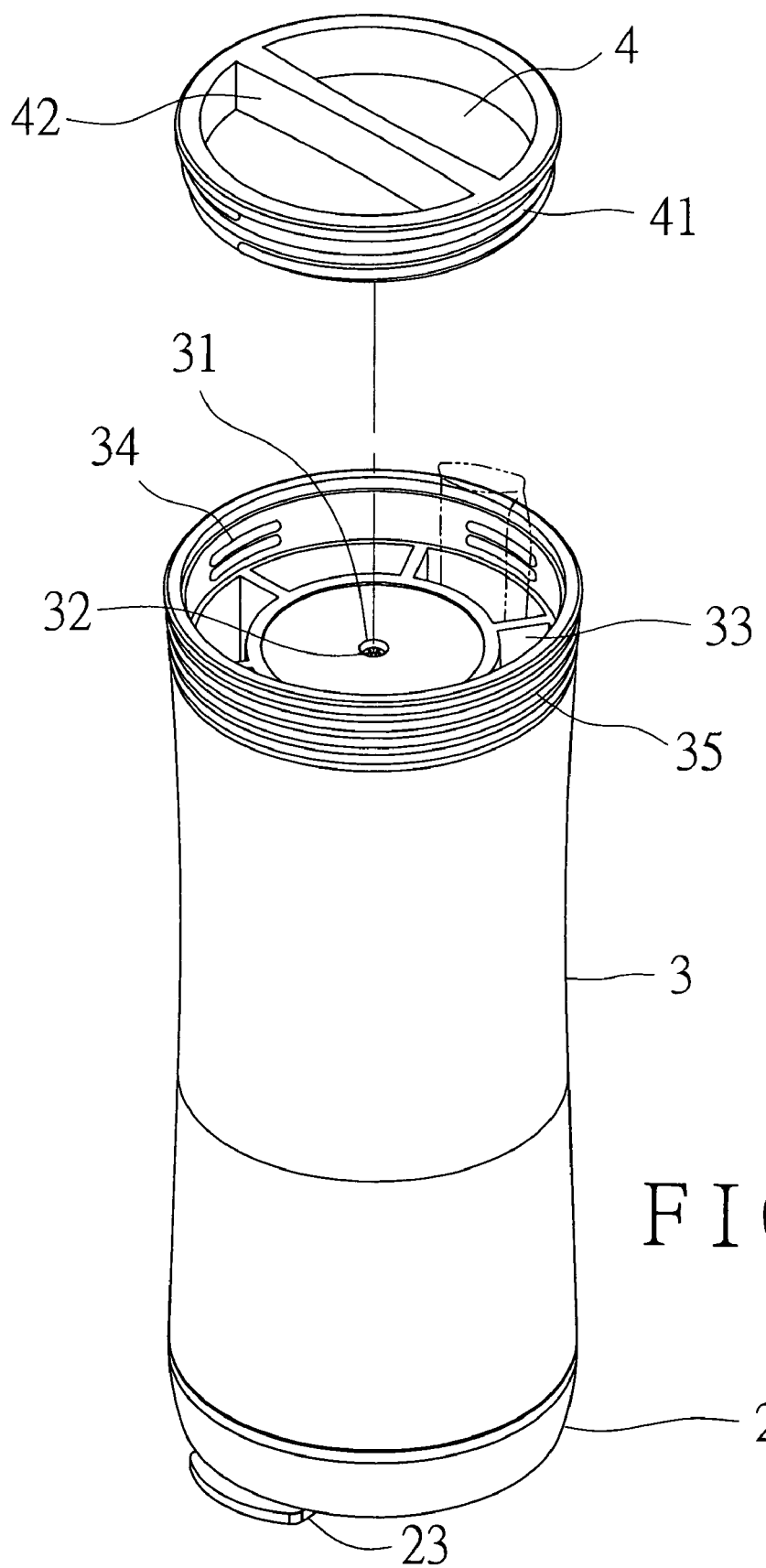
FIG. 6 is a perspective view of the first preferred embodiment in an inverted position, which contains a drink bag.
Figure 7:
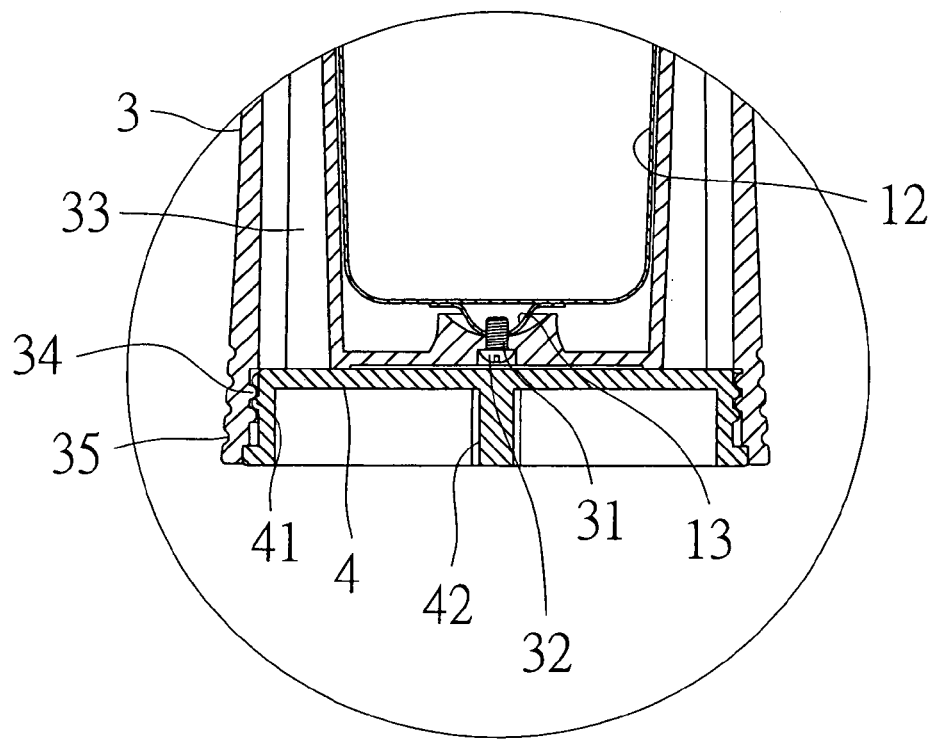
FIG. 7 is a partial sectional view of the first embodiment.

The upper cover 2 has threads 21 on an outer circumferential side of a lower portion thereof, and therefore can be joined on the containing body 1 with the threads 11 and 21 being threadedly joined together. Referring to FIG. 4 as well, the upper cover 2 has a drink outlet 22 thereon. A moving cap 23 is pivoted on a middle portion of the upper cover 2 to seal the outlet 22. The moving cap 23 has a fastening piece 231 protruding from a bottom side thereof, and therefore can be fastened on the drink outlet 22 with the help of the fastening piece 231. Furthermore, the upper cover 2 has several pores 24 thereon so that drinks can flow out of the containing body 1 through the drink outlet 22 more easily. And, the moving cap 23 has several small raised portions 232 on the bottom side, which will seal the pores 24 when the moving cap 23 is in the closed position.

The thing holding member 3 is like a round barrel, and has a through hole 31 on a bottom side. The containing body 1 is held in and secured to the thing holding member 3 with a threaded fixing element 32 being passed through the through hole 31 of the thing holding member 3 and the screw hole 13 of the containing body 1. The thing holding member 3 has several hollow holding portions 33 on an inner circumferential side thereof, which can contain tea bags, sugar bags etc. Moreover, the thing holding member 3 has threads 34 and 35 on inner and outer circumferential sides of a lower portion thereof.

The bottom cover 4 is like a round plate, and has threads 41 on an outer circumferential side thereof. The bottom cover 4 can be joined on the lower end of the thing holding member 3 with the threads 41 and 34 being threadedly joined together. The bottom cover 4 has a force application portion 42 across a bottom side thereof so that one can apply force to open/close the bottom cover 4 more easily.

In assembly, referring to FIGS. 1 to 4, the containing body 1 is put in the thing holding member 3, and the threaded fixing element 32 is passed through the through hole 31 and the screw hole 13. The bottom cover 4 is threadedly joined on the inner threads 34 of the lower portion of the thing holding member 3 so as to seal the hollow holding portions 33 in the thing holding member 3, thus preventing the tea bags and sugar bags from falling out of the hollow holding portions 33. And, the upper cover 2 is threadedly joined on the inner threads 11 of the upper portion of the containing body 1 so as to seal the upper opening of the containing body 1.

Referring to FIGS. 3 to 7, the user opens the bottom cover 4, and puts tea bags, sugar bags etc in the hollow holding portions 33 of the thing holding member 3. Therefore, the tea bags and sugar bags are carried together with the vessel. Afterwards, the user opens the upper cover 2, and puts the tea bags, sugar bags and boiled water into the containing body 1 to make tea. Next, the upper cover 2 is joined back on the containing body 1 to seal the upper opening of the containing body 1. Therefore, the user is allowed to drink the tea from the outlet 22 of the upper cover 2 after the moving cap 23 is pivoted to the opened position; the pores 24 on the upper cover 2 allows the tea to flow out through the drink outlet 22 more easily.

Figure 8:
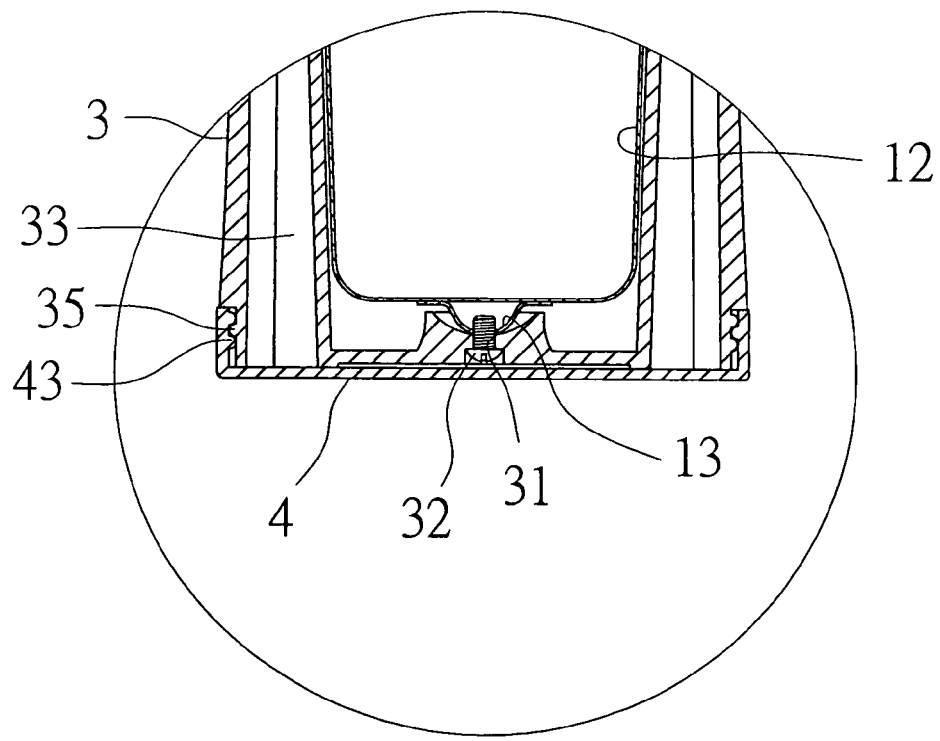
FIG. 8 is a partial sectional view of a second embodiment.

Shown in FIG. 8 is a second preferred embodiment of a vessel of the present invention; the vessel includes a bottom cover 4, which has threads 43 on an inner circumferential side thereof, which can be threadedly joined on the outer threads 35 of the lower portion of the thing holding member 3.

From the above description, it can be seen that the vessel of the present invention has the following advantages:

1. The thing holding member of the vessel has several hollow holding portions therein, which can contain things such as tea bags and sugar bags. Therefore, tea bags and sugar bags can be carried in the vessel to be easily accessible.

2. The upper cover can seal the containing body of the vessel when it is threadedly joined on the containing body. The upper cover has a drink outlet, and a moving cap to seal the drink outlet. Moreover, the upper cover has several bores thereon, which allow the drink to flow out of the containing body through the drink outlet more easily.

What is claimed is:

1. A vessel structure comprising,
   a holding member; the holding member having an opening on a first end thereof and a plurality of hollow holding portions formed in a second end thereof;
   a bottom cover; the bottom cover being removably coupled to the second end of the holding member to close the hollow holding portions;
   a containing body; the containing body being coupled to the holding member within the opening thereof, the containing body having an opening on an upper end thereof and threads formed adjacent to the opening of the containing body; and
   an upper cover; the upper cover having threads formed on a lower end thereof and being threadedly coupled to the containing body for forming a removable closure therefore.

2. The vessel structure as claimed in claim 1, wherein the upper cover has a drink outlet thereon, and has a moving cap covering the drink outlet.

3. The vessel structure as claimed in claim 2, wherein the moving cap has a fastening piece protruding therefrom, which is used to fasten the moving cap on the drink outlet.

4. The vessel structure as claimed in claim 2, wherein the upper cover has a plurality of bores thereon, and the moving cap has a plurality of raised portions to seal the pores of the upper cover.

5. The vessel structure as claimed in claim 1, wherein the containing body has a lower step-shaped portion, and the holding member is securely joined on to the lower step-shaped portion.

6. The vessel structure as claimed in claim 1, wherein the containing body has a screw hole, and the holding member has a through hole, and a threaded fixing element is passed through the through hole and the screw hole.

7. The vessel structure as claimed in claim 1, wherein the holding member has threads, and the bottom cover has threads threadedly joined on the threads of the holding member.

8. The vessel structure as claimed in claim 1, wherein the bottom cover has a force application member extending diametrically thereon to form a handle for gripping the bottom cover when engaging the bottom cover to the holding member and removing the bottom cover therefrom.

* * * * *